United States Patent
Helpertz et al.

(10) Patent No.: US 9,759,326 B2
(45) Date of Patent: Sep. 12, 2017

(54) SEALING ARRANGEMENT ON A PUMP SHAFT

(71) Applicant: Brinkmann Pumpen K.H. Brinkmann GmbH & Co. KG, Werdohl (DE)

(72) Inventors: Markus Helpertz, Dortmund (DE); Matthias Radermacher, Hückeswagen (DE)

(73) Assignee: Brinkmann Pumpen K.H. Brinkmann GmbH & Co. KG, Werdohl (DE)

( * ) Notice: Subject to any disclaimer, the term of this patent is extended or adjusted under 35 U.S.C. 154(b) by 0 days.

(21) Appl. No.: 15/318,395

(22) PCT Filed: Jun. 1, 2015

(86) PCT No.: PCT/EP2015/062171
§ 371 (c)(1),
(2) Date: Dec. 13, 2016

(87) PCT Pub. No.: WO2016/000890
PCT Pub. Date: Jan. 7, 2016

(65) Prior Publication Data
US 2017/0122436 A1    May 4, 2017

(30) Foreign Application Priority Data
Jul. 2, 2014 (DE) .................... 20 2014 103 019 U

(51) Int. Cl.
*F16J 15/40* (2006.01)
*F16J 15/00* (2006.01)
(Continued)

(52) U.S. Cl.
CPC ............... *F16J 15/004* (2013.01); *F04C 2/16* (2013.01); *F04C 15/0038* (2013.01); *F16J 15/3404* (2013.01); *F04C 2240/60* (2013.01)

(58) Field of Classification Search
CPC ...... F16J 15/34; F16J 15/3404; F16J 15/3436; F04C 2/16; F04C 15/0038; F04C 2240/60
See application file for complete search history.

(56) References Cited

U.S. PATENT DOCUMENTS 4,671,679 A * 6/1987 Heshmat .................. F16J 15/43
                                                                277/410
4,721,311 A * 1/1988 Kakabaker ............. F16J 15/162
                                                                277/369

(Continued)

FOREIGN PATENT DOCUMENTS

| DE | 7001479 U | 6/1971 |
| DE | 3544783 A1 | 6/1987 |
| WO | 99/23433 A1 | 5/1999 |

*Primary Examiner* — Gilbert Lee
(74) *Attorney, Agent, or Firm* — Richard M. Goldberg

(57) ABSTRACT

A sealing arrangement for a pump shaft, includes a restrictor section (18) arranged along the shaft (16) and separating a high-pressure chamber (12) of the pump from a sealing chamber (20), a seal (22) arranged on the shaft (16) and between the sealing chamber (20) and a low-pressure chamber (30), a restrictor leakage line (34) leading from the sealing chamber (20) to the exterior, and a seal leakage line (42) leading from the low-pressure chamber (30) to the exterior, wherein a section of the seal leakage line (42) runs through the interior of the restrictor leakage line (34).

5 Claims, 1 Drawing Sheet

(51) Int. Cl.
*F16J 15/34* (2006.01)
*F04C 2/16* (2006.01)
*F04C 15/00* (2006.01)

(56) References Cited

U.S. PATENT DOCUMENTS

| | | | | |
|---|---|---|---|---|
| 5,249,812 A | * | 10/1993 | Volden | F16J 15/162 |
| | | | | 277/361 |
| 6,481,720 B1 | * | 11/2002 | Yoshida | B63H 23/321 |
| | | | | 277/400 |
| 7,413,194 B2 | * | 8/2008 | Wright | F16J 15/3288 |
| | | | | 277/355 |
| 8,186,688 B2 | * | 5/2012 | Akiyama | F16J 15/3412 |
| | | | | 277/362 |

* cited by examiner

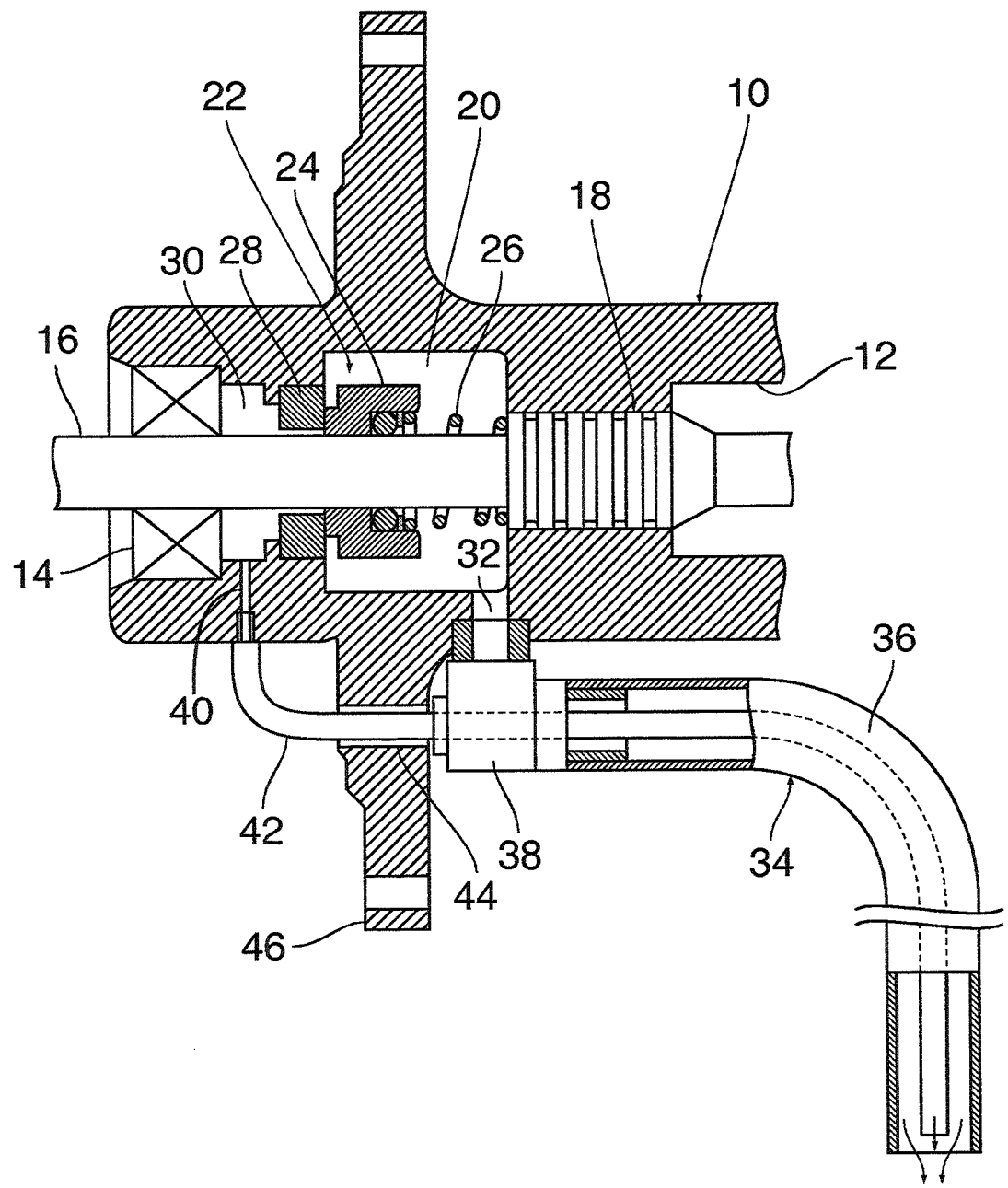

SEALING ARRANGEMENT ON A PUMP SHAFT

BACKGROUND OF THE INVENTION

The invention relates to a sealing arrangement on a pump shaft, comprising a restrictor section which is arranged along the shaft and separates a high-pressure space of the pump from a sealing chamber, a seal arranged on the shaft between the sealing chamber and a low-pressure chamber, a restrictor leakage line leading from the sealing chamber to the exterior, and a seal leakage line leading from the low-pressure chamber to the exterior.

SUMMARY OF THE INVENTION

In many pumps it is necessary to pass a shaft which serves for driving a pump element, e.g. for driving a screw spindle in a screw spindle pump, through the interior of a high-pressure chamber of the pump. This implies the requirement to reliably seal the shaft against the medium that is under high pressure in the high-pressure chamber.

Known sealing arrangements of this type have a two-stage design, comprising a restrictor section as a first stage and a proper seal, e.g. a slide ring seal, as a second stage. A certain restrictor leakage flow through the restrictor section is admitted, and the leakage liquid entering into the sealing chamber via the restrictor section is drained to the outside via the restrictor leakage line. However, the restrictor section presents such a high resistance against the leakage flow that a considerable pressure drop occurs across the restrictor section and, consequently, the second sealing stage is relieved from pressure. For that reason, only little leakage is generally found at the second sealing stage. In some seal types, e.g. a sliding ring seal, a certain leakage is necessary also in this second sealing stage for lubricating purposes. In general, the amount of leaking liquid is so small that it can simply be allowed to drip. In some cases it is desired however that even this small amount of leakage liquid is neatly drained. This is the purpose of the seal leakage line connected to the low-pressure chamber.

Since the restrictor chamber on the low-pressure side of the slide ring seal is sealed essentially tightly, the certain back pressure can be tolerated in the restrictor leakage line. However, such a back pressure is not admissible for the seal leakage line because the low pressure chamber is generally closed on the outboard side only by a bearing which is not fluid-tight, so that a back pressure here would directly lead to a leakage through the bearing. For this reason it is not possible without complications to connect the low-pressure chamber to the restrictor leakage line simply by a short line section in order to drain both leakage flows via a common line. It is therefore necessary to provide two separate leakage lines, which requires increased investment in the installation.

It is an object of the invention to provide a sealing arrangement which permits a reliable drainage of the leakage flows with a simplified installation.

According to the invention, this object is achieved by the feature that a section of the seal leakage line runs through the interior of the restrictor leakage line.

This solution has at first the advantage that the installation of the restrictor leakage line and also of the major part of the seal leakage line can be achieved in a single operation, so that the installation work is rationalised. Moreover, the appearance of the pump is improved by reducing the number of lines that are visible from the outside. Another remarkable advantage is that the outlet opening of the seal leakage line which runs through the interior of the restrictor leakage line may be positioned relatively far downstream in the restrictor leakage line, so that the flow in the restrictor leakage line leads to a jet pump effect which not only prevents reliably a back pressure from occurring in the seal leakage line but, on the contrary, creates a certain suction which assures a reliable drainage of the leakage flow.

Useful details and further developments of the invention are indicated in the dependent claims.

In an advantageous embodiment the restrictor leakage line and preferably also the seal leakage line are formed by flexible tubes, wherein the outer diameter of the tube forming the seal leakage line is significantly smaller than the internal diameter of the tube forming the restrictor leakage line. The tube of the restrictor leakage line can then be installed as required, for example along the outside of the pump so as to lead to a non-pressurized tank or to a sump at the base of the pump, and the tube of the seal leakage line will readily follow all bends in the restrictor leakage line.

The length of the tube is preferably selected such that the outlet opening of the seal leakage line is slightly upstream of the outlet opening of the restrictor leakage line. This assures that the medium is practically at ambient pressure at the mouth of the seal leakage line, but the restrictor leakage flow still has a certain flow velocity which creates the above-mentioned jet pump effect.

BRIEF DESCRIPTION OF THE DRAWINGS

An embodiment example will now be described in conjunction with the drawing, wherein:

The single drawing FIGURE shows a sectional view of a part of a pump housing having a sealing arrangement on a pump shaft in accordance with the invention.

DETAILED DESCRIPTION

The drawing shows, in an axial section, a part of a pump housing, e.g. a housing 10 of a screw spindle pump, which forms a high-pressure chamber 12 and in which a shaft 16 which passes through the interior of the high-pressure chamber 12 is supported by means of a bearing 14. For example, a screw spindle adjoins coaxially to the right end of the shaft 16 in the drawing, whereas the left end in the drawing is connected to a drive motor which has not been shown.

In a portion adjacent to the high-pressure chamber 12 the shaft 16 passes through a restrictor section 18 in which the shaft 16 forms several collars, similar to piston rings, which form a plurality of small annular gaps with the surrounding wall of the housing 10. On the side of the restrictor section 18 opposite to the high-pressure chamber 12 the shaft 16 passes through a sealing chamber 20 in which a slide ring seal 22 is arranged.

The slide ring seal 22 has a slide ring 24 which co-rotates with the shaft 16 and is biased by a spring 26 against a stationary mating ring 28 which itself is supported in axial direction at a wall of the housing 10. The space between the mating ring 28 and the bearing 14 constitutes a low-pressure chamber 30 which is practically at atmospheric pressure because the bearing 14 is not fluid-tight.

In the high pressure chamber 12 the fluid displaced by the pump has a relatively high pressure, i.e. the output pressure of the pump. A fraction of this fluid will therefore leak into the sealing chamber 20 via the restrictor section 18 where, however, the restrictor section acts as a labyrinth which considerably increases the flow resistance, so that a substantial pressure drop occurs across the restrictor section and, consequently, the slide ring seal in the sealing chamber 20 is subject only to a substantially lower pressure. The restrictor leakage flow transiting into the sealing chamber 20 via the restrictor section 18 is drained into a restrictor leakage line 34 via a radial bore 32 formed in the peripheral wall of the sealing chamber 20. This restrictor leakage line is essentially formed by a flexible tube 36 having a relatively large diameter and is connected to the bore 32 by a fitting 38 and leads to a collection vessel (not shown) for the leakage liquid outside of the housing 10. This collection vessel may for example be a separate tank or a pump inlet.

A permanent restrictor leakage flow through the restrictor leakage line 36 is necessary for achieving the desired pressure drop at the restrictor section 18.

The slide ring 24 and the mating ring 28 of the slide ring seal are in frictional engagement with one another with precisely machined flat slide surfaces and are therefore separated only by a gap with a width of at most several μm, so that leakage through the slide ring seal into the low-pressure chamber 30 is reduced to a minimum. If some liquid should nevertheless enter into the low-pressure chamber 30, this liquid is drained via a radial bore 40 and a seal leakage line 42, so that the liquid does not escape to the outside through the bearing 14.

The seal leakage line 42 is formed by a thinner tube which is connected to the bore 40 by a nipple and passes through the fitting 38 and through the interior of the tube 36 up to, approximately, the end of this tube. In the example shown, the seal leakage line 42 passes also through a bore 44 of a flange 46 that is moulded to the housing 10 and extends between the radial bores 32 and 40 of the housing.

The outer diameter of the tube forming the seal leakage line 42 is significantly smaller than the internal diameter of the tube 36, so that an annular passage with a sufficient cross-section for draining the restrictor leakage flow remains in the tube 36.

At the mouth of the tube 36 the restrictor leakage flow can flow out unrestrictedly into the above-mentioned tank, so that the pressure here is practically equal to atmospheric pressure. The fluid flows past and encircles the mouth of the seal leakage line 42 which slightly retreats relative to the mouth of the tube 36. This creates a suction at the mouth of the seal leakage line due to the jet pump effect, as has been symbolized by arrows in the drawing. This suction assures a reliable drainage of the fluid from the low-pressure chamber 30.

What is claimed is:

1. A sealing arrangement for a pump shaft of a pump, comprising:
    a restrictor section arranged along the shaft and separating a high-pressure chamber of the pump from a sealing chamber,
    a seal arranged on the shaft and between the sealing chamber of the pump and a low-pressure chamber of the pump,
    a restrictor leakage line leading from the sealing chamber to an exterior of the pump, and
    a seal leakage line leading from the low-pressure chamber to the exterior, wherein a section of the seal leakage line runs through an interior of the restrictor leakage line.

2. The sealing arrangement according to claim 1, wherein a section of the restrictor leakage line through which the seal leakage line passes is formed by a flexible tube.

3. The sealing arrangement according to claim 1, wherein at least a section of the seal leakage line is formed by a flexible tube.

4. The sealing arrangement according to claim 1, wherein the seal leakage line extends inside the restrictor leakage line up to a position in proximity to an open downstream end of the restrictor leakage line.

5. The sealing arrangement according to claim 4, wherein a mouth of the seal leakage line retreats relative to a mouth of the restrictor leakage line.

* * * * *